(12) United States Patent
Ahokas

(10) Patent No.: US 7,551,188 B2
(45) Date of Patent: Jun. 23, 2009

(54) SCROLLING ITEMS ON A LIST

(75) Inventor: Jorma Michael Ahokas, Tampere (FI)

(73) Assignee: Nokia Corporation, Espoo (FI)

( * ) Notice: Subject to any disclaimer, the term of this patent is extended or adjusted under 35 U.S.C. 154(b) by 498 days.

(21) Appl. No.: 10/957,422

(22) Filed: Oct. 1, 2004

(65) Prior Publication Data

US 2006/0075358 A1   Apr. 6, 2006

(51) Int. Cl.
G09G 5/00   (2006.01)

(52) U.S. Cl. ..................................... 345/684

(58) Field of Classification Search ............ 345/684
See application file for complete search history.

(56) References Cited

U.S. PATENT DOCUMENTS

| | | | |
|---|---|---|---|
| 5,465,566 A * | 11/1995 | Edwards et al. ............. 57/204 |
| 5,936,618 A * | 8/1999 | Spiero et al. .............. 345/204 |
| 6,337,694 B1 * | 1/2002 | Becker et al. ............. 345/684 |
| 6,473,752 B1 * | 10/2002 | Fleming, III ............... 707/4 |
| 6,771,279 B2 * | 8/2004 | Syukri ..................... 345/684 |
| 6,972,776 B2 * | 12/2005 | Davis et al. ............... 345/684 |
| 2002/0027565 A1 | 3/2002 | Syukri |
| 2002/0143741 A1 | 10/2002 | Laiho et al. |
| 2003/0043198 A1 | 3/2003 | Delpuch |
| 2007/0209017 A1 * | 9/2007 | Gupta et al. .............. 715/781 |

FOREIGN PATENT DOCUMENTS

| | | | |
|---|---|---|---|
| EP | 1124372 | | 8/2001 |
| JP | 06332433 A | * | 12/1994 |
| JP | 11312038 | | 11/1999 |
| JP | 11312038 A | * | 11/1999 |
| JP | 2004126338 | | 4/2004 |
| JP | 2007121179 A | * | 5/2007 |

* cited by examiner

*Primary Examiner*—Doug Hutton
*Assistant Examiner*—Gregory A Distefano
(74) *Attorney, Agent, or Firm*—Alfred A. Fressola; Ware, Fressola, Van Der Sluys & Adolphson, LLP

(57) ABSTRACT

The invention relates to a method for scrolling items on a list, wherein the method comprises: conducting said scrolling on a user interface and adaptively controlling speed of the scrolling depending on the items on the list.

22 Claims, 4 Drawing Sheets

SCROLLING ITEMS ON A LIST

FIELD OF THE INVENTION

The invention relates to scrolling items on a list.

BACKGROUND OF THE INVENTION

In many user interfaces in various devices the user needs to scroll a list of items in order to find the item the user wants. Such a list may be, for example, a list of names in a phone book, a list of (e-mail) addresses, a list of pieces of music, a list of book-marks for www pages, or a list of some other options available for selection.

Currently the scrolling speed in such user interfaces is usually constant and optimised for lists having no more than a few dozens of items. If the list that is scrolled is relatively long, the scrolling can thereby take a considerable amount of time and thus deteriorate the user experience.

In some products this problem has been solved by means of accelerated scrolling. Therein the scrolling speed increases the longer the user continues to scroll. That is, in the beginning the scrolling speed is relatively slow or "normal" and scrolling gains speed as the user continues to scroll. The problem in this solution is that as the scrolling speed increases, it becomes more and more difficult to see the items in the list. Thus, the desired item may be passed unnoticed at the higher speeds.

There are also solutions where typing a character brings the scroll bar to the first item starting with that character in the list. After that the user can continue scrolling the items normally. The problem in this solution is that the user needs to know the first character of the target item.

US 2002/0143741 A1 presents another alternative for scrolling items on a list. Therein, for example scrolling of a phone book is arranged so that pressing and holding a scroll key causes that only one name starting with each alphabetical character is displayed. In order to find a name starting with a specific alphabet the user scrolls to the one name shown which starts with that alphabet and releases the scroll key. Then scrolling continues one by one in the group of all names starting with that alphabet. Also in this solution the user needs to know the first alphabet of the target name.

SUMMARY OF THE INVENTION

An object of the invention is to provide a new solution for scrolling items on a list.

One of the basic ideas of the invention is to adaptively control scrolling speed depending on the relevance of the items that are currently scrolled.

According to a first aspect of the invention, there is provided a method for scrolling items on a list, wherein the method comprises:

conducting said scrolling on a user interface, and adaptively controlling speed of the scrolling depending on the items on the list.

According to a second aspect of the invention, there is provided a device comprising a user interface, scrolling means for conducting scrolling of items on a list on said user interface, and controlling means for adaptively controlling speed of the scrolling depending on the items on the list.

According to a third aspect of the invention, there is provided a computer program executable in a computing device, the computer program providing a routine for scrolling items on a list, wherein said computer program controls the computing device to conduct said scrolling on a user interface, and to adaptively control speed of the scrolling depending on the items on the list.

Dependent claims contain preferable embodiments of the invention. The subject matter contained in dependent claims relating to a particular aspect of the invention is also applicable to other aspects of the invention.

The invention is well suited for scrolling long lists of data (for example thousands of items). Nevertheless, the invention may also be used in connection with scrolling shorter list. By means of certain embodiments of the invention it is possible to provide fast scrolling speed on average while improving visibility to relevant items at the same time.

BRIEF DESCRIPTION OF THE DRAWINGS

Embodiments of the invention will now be described by way of example with reference to the accompanying drawings in which.

DETAILED DESCRIPTION

In most applications there is some way of determining the relative relevance of the items on the list. For example, in many applications, users are more likely to use items which they have recently selected, visited, modified or added, which they use frequently, or which are in proximity of the current location of the user.

According to an embodiment of the invention, a relevance value is maintained for each item in the list. The higher the relevance value of an item is the slower scrolling is around that item or vice versa. It is clear to a man skilled in the art that alternatively scrolling speed may be slower around items having low relevance values, if such implementation is preferred. (However, in that case the relevance value could be renamed as an "irrelevance value".)

The relevance values of the items on a list may be stored into suitable storage or they may be recalculated "in real-time" each time the list is opened. Also a combination of these alternatives is possible.

The relevance value of an item is defined on the basis of application and data item specific details. The relevance value may be dynamically varied, for example on the basis of user's actions. As an example, whenever an item is selected, visited, modified or added, its relevance value may be increased. Then, if the item is not revisited during a predefined time period, the relevance value may be decreased gradually. Additionally, if items on the list are landmarks or physical locations (for example restaurants in a city) and the items comprise co-ordinates of respective landmarks, the relevance value of the items may be dynamically varied according to the physical location of the user. Assuming that user's device comprises positioning capability, it is possible to determine if items on the list are physically far away or close to the user's current location and to set a higher relevance value for the items located close by. Location of the user device and relevance values of the items on the list may be updated periodically or as the need for updating arises.

In order to keep speed variations sensible, it is possible to set minimum and maximum values for the scrolling speed.

Additionally, the user may be given a possibility to rate or classify items on the list and this rating may be used as a relevance value for the respective items. For example, the user may rate songs or images according to personal preference. In such a case, it is more likely that, for example, a 5-star song is selected than that a 1-star song is selected. This alternative may be used in combination with dynamically varying the relevance value on the basis of user's actions or user's location.

Figure 1:
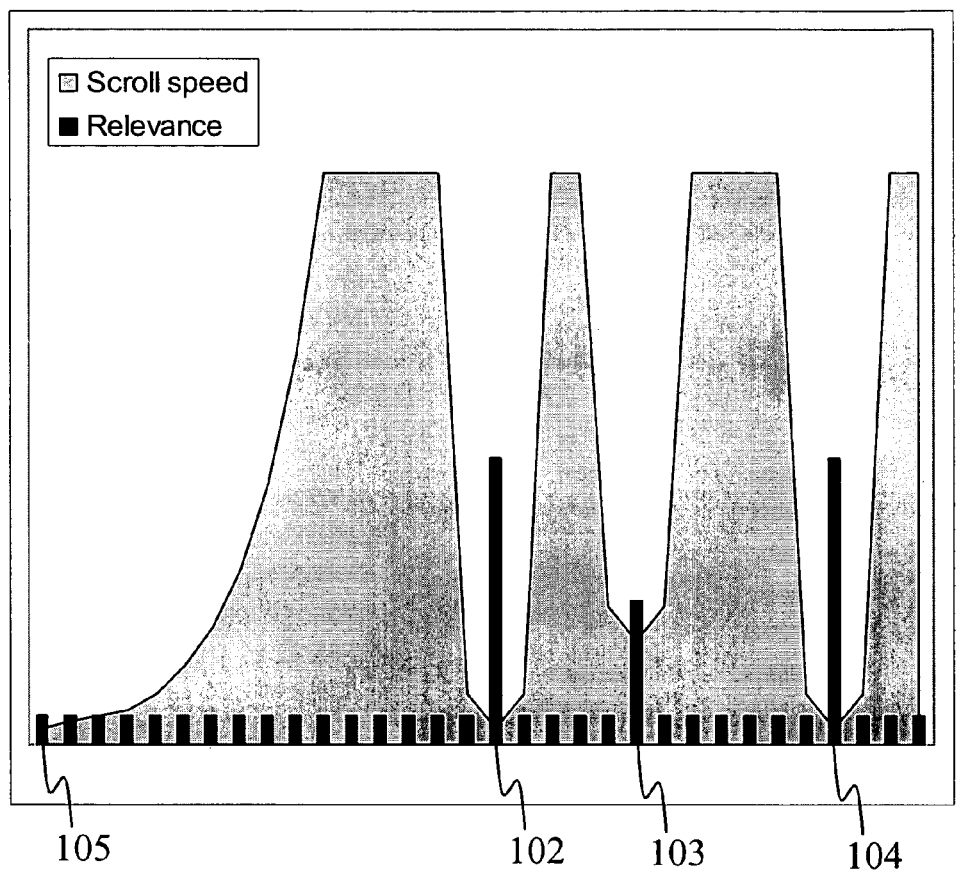
FIG. 1 is a graph illustrating scrolling speed variations on the basis of the relevance values.

FIG. 1 is a graph illustrating scrolling speed variations on the basis of the relevance values. Black bars illustrate relevance values of different items on a list and grey area illustrates the scrolling speed. In the Figure it can be seen that items 102-104 have a higher relevance value than the other items on the list. Scrolling starts from item 105. As the relevance values of item 105 and the items following item 105 are low, the scrolling speed is gradually increased to its maximum value. Then, as item 102 approaches, the scrolling speed is decreased to its minimum because of the high relevance value of item 102. Since the relevance values of the items following item 102 are low, the scrolling speed is again increased to its maximum after item 102 has been passed. Similarly, scrolling speed is decreased for items 103 and 104. However, since the relevance value of item 103 is not as high as the relevance values of items 102 and 104, the scrolling speed is not decreased quite as much for item 103 as for items 102 and 104.

FIGS. 2A-2E illustrate an implementation according to an embodiment of the invention. Therein, a list of sixteen (16) items is shown and the relevance of the items on the list varies between 0 for the least relevant items and 1.0 for the most relevant items. The relevance value of the items 1-8 and 13-15 is 0 and the relevance values of the items 9, 10, 11, 12 and 16 are respectively 0.4, 1.0, 0.6, 0.3 and 0.7. The maximum scroll speed is Vmax and the amount by which the most relevant item can slow down the scroll speed is Vr. Assuming that the relevance value for an item of the list is F, then the scroll speed around that item would be $V = V_{max} - F \cdot V_r$.

It is possible that the scroll speed would be altered individually around each item of the list, but this may lead into somewhat erratic scroll speed. In order to avoid this, the scroll speed is altered on the basis of the highest relevance value within a sliding window or a set of (consecutive) items of the list in the embodiment of FIGS. 2A-2E. The window in this example is "five-items-wide". (It should be clear that also other solutions are possible.) In the beginning of scrolling the scroll speed is set to some default value, which is herein the maximum scroll speed Vmax.

Figure 2A:
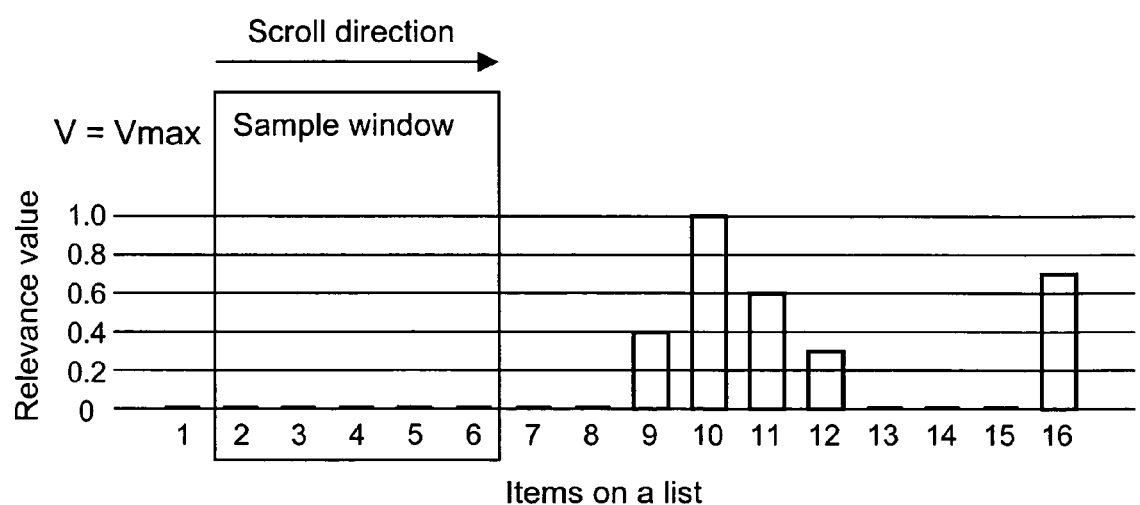
FIGS. 2A-2E are diagrams that illustrate an implementation according to an embodiment of the invention.

In FIG. 2A, the window covers items 2-6 and the highest relevance value within the window is 0. Thereby the scroll speed is maintained in its maximum Vmax.

Figure 2B:
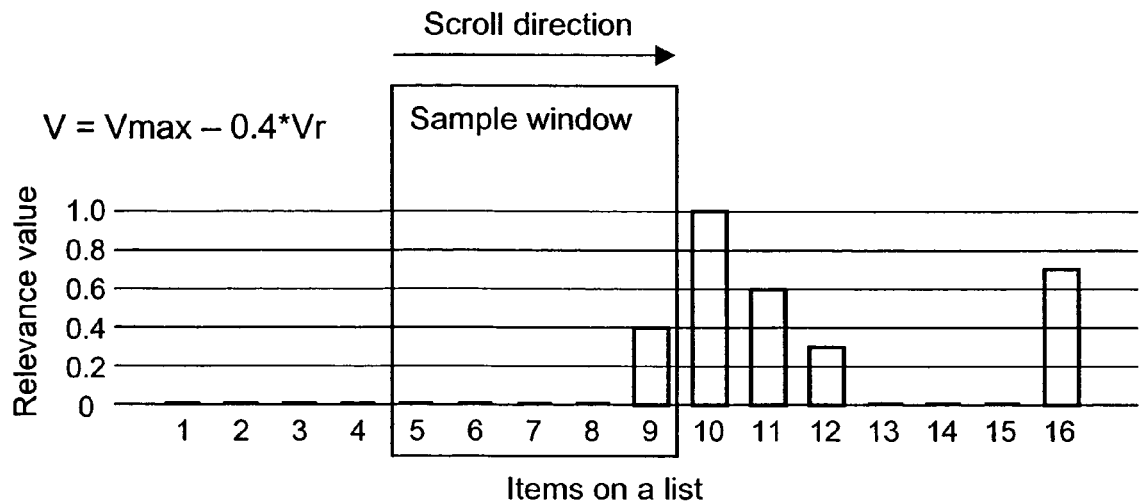

In FIG. 2B, the window covers items 5-9 and the highest relevance value within the window is 0.4. Thereby the scroll speed is reduced to Vmax−0.4*Vr.

Figure 2C:
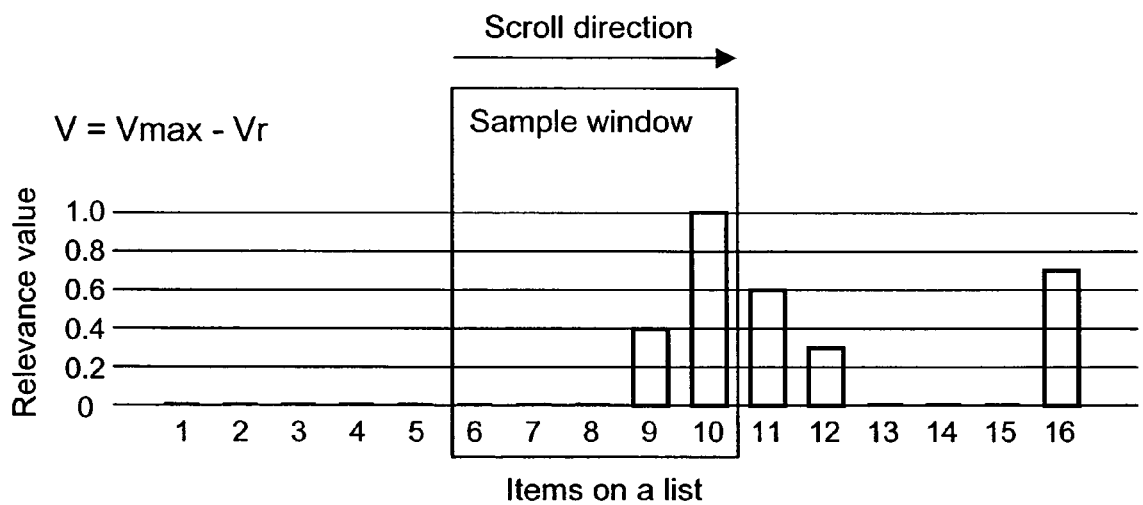

In FIG. 2C, the window covers items 6-10 and the highest relevance value within the window is 1.0. Thereby the scroll speed is further reduced to its minimum Vmax-Vr.

Figure 2D:
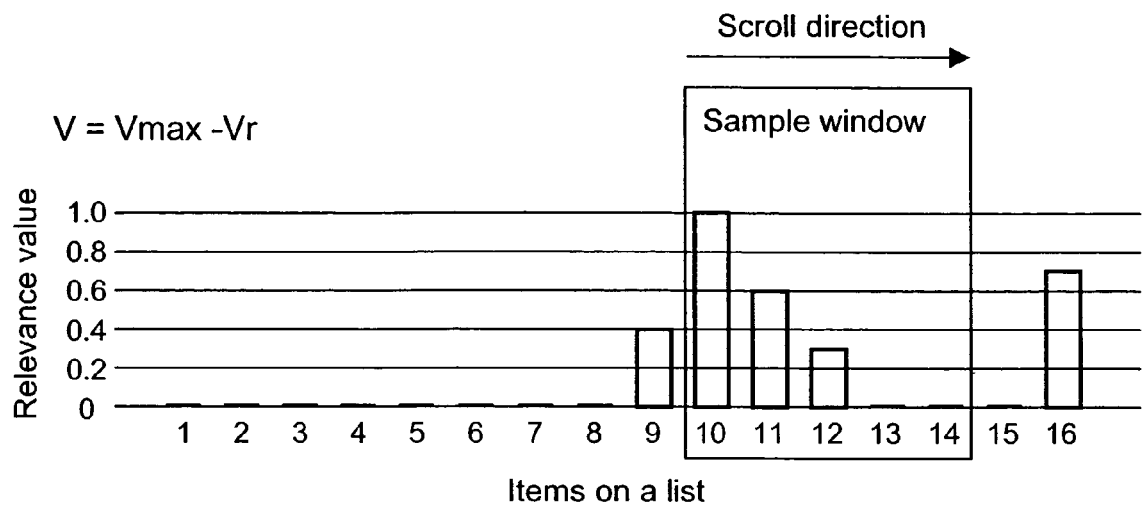

In FIG. 2D, the window covers items 10-14 and the highest relevance value within the window is still 1.0. Thereby the scroll speed is maintained in its minimum Vmax-Vr.

Figure 2E:
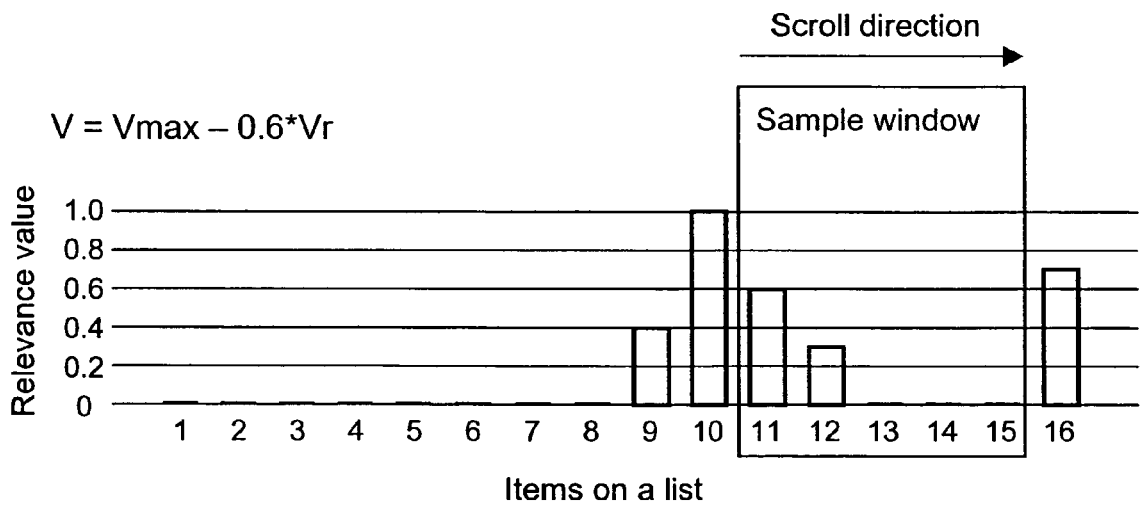

In FIG. 2E, the window covers items 11-15 and the highest relevance value within the window is 0.6. Thereby the scroll speed is increased from its minimum to Vmax−0.6*Vr.

The implementation illustrated in FIGS. 2A-2E may be further modified to include an additional secondary window, which is wider than the primary window and which slows down the scroll speed somewhat in advance. Furthermore, information other than the highest relevance value within the window may be the basis for determining the scroll speed. For example, mean over the relevance value within the window could be used or the relevance values and thus the scroll speed within a window could be correlated with the relevance values of the previous window.

Figure 3:
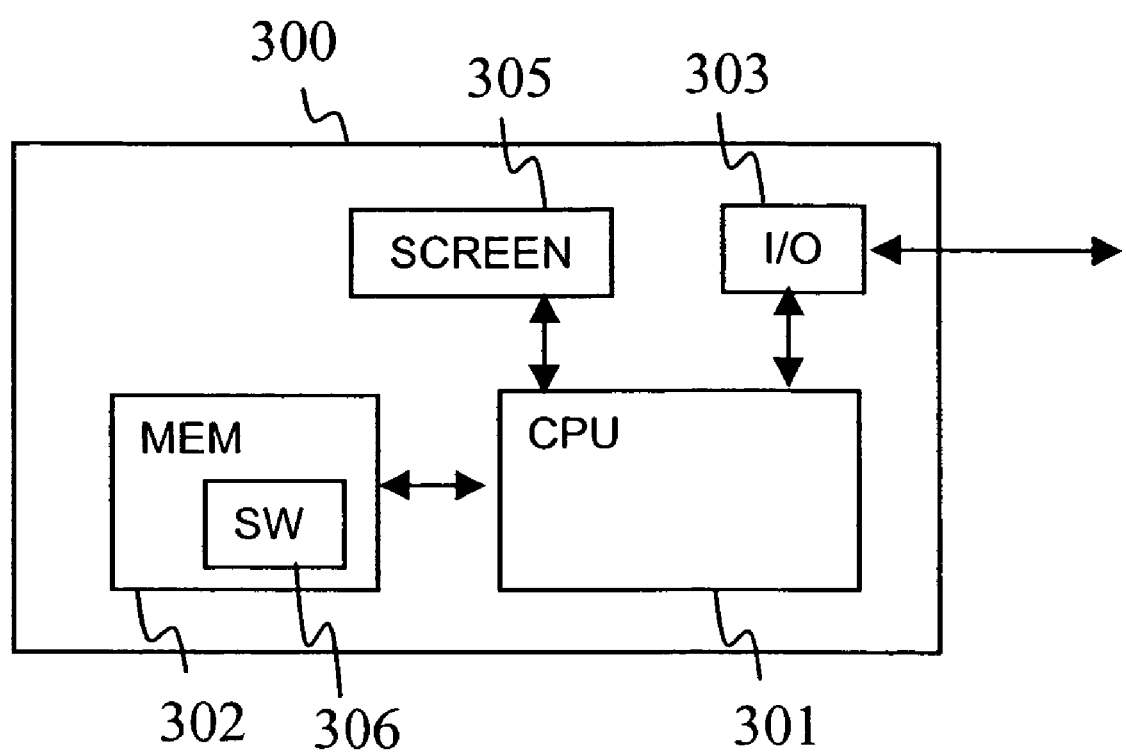
FIG. 3 is a block diagram that illustrates a device according to an embodiment of the invention.

The invention may be implemented for example by means of a suitable combination of hardware and software components. FIG. 3 illustrates a device 300 according to an embodiment of the invention. Such device may be, for example, a mobile terminal, a handheld computer, a smart phone, laptop computer, desktop computer or some other suitable device.

The device 300 comprises a processing unit 301 and an input/output module 303 coupled to the processing unit 301. The user of the device may give commands through the input/output module 303. Furthermore, it is possible that the device communicates with other devices through the input/output module 303. The processing unit 301 is coupled to a memory 302 and screen 305 as well. The memory comprises computer program 306 executable in the processing unit 301.

The processing unit controls, in accordance with the computer program 306, the device to provide scrolling functionality for scrolling items on a list on the screen 305. In accordance with the software application 306, the speed of scrolling the items on the list is adaptively controlled depending on the items on the list.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

What is claimed is:

1. A method comprising:
    scrolling items in a list via a user interface,
    maintaining a relevance value for each item in the list,
    defining said relevance value as ratings explicitly indicating personal preference for said each item in the list, and
    adaptively controlling speed of the scrolling, wherein said scrolling speed is controlled based upon the relevance values of a set of said items in the list, and wherein the scrolling speed is based upon an average of the relevance values of the set of said items.

2. The method according to claim 1, wherein said controlling is further based on relevance of the item having the highest relevance within the set of items.

3. The method according to claim 1, wherein said list is one of the following: entries of a phone book, entries of an address book, a list of pieces of music, a list of bookmarks for www pages, a list of landmarks, and a list of options available for selection.

4. The method according to claim 1, further comprising dynamically varying said relevance values on the basis of user's actions.

5. The method according to claim 1, further comprising dynamically varying said relevance values on the basis of user's location.

6. The method according to claim 1, further comprising increasing the relevance value of an item in the list, when an item is visited, modified or added.

7. The method according to claim 1, further comprising decreasing the relevance value of an item in the list, if an item is not revisited or modified during a predefined time period.

8. The method according to claim 1, further comprising setting constant minimum and/or maximum values for the scrolling speed.

9. The method according to claim 1, wherein the specific items of said set of said items dynamically varies as said scrolling of items occurs.

10. The method according to claim 1, wherein the specific items of said set of said items dynamically varies as said scrolling of items occurs.

11. A device comprising:
a user interface, and a processing unit configured to conduct scrolling of items in a list in said user interface, wherein the processing unit is further configured:
to maintain a relevance value for each item in the list,
to define said relevance value as ratings explicitly indicating personal preference for said each item in the list, and
to adaptively control speed of the scrolling, wherein said scrolling speed is controlled based upon the relevance values of a set of said items in the list, and
wherein the scrolling speed is based upon an average of the relevance values of the set of said items.

12. The device according to claim 11, wherein said processing unit is further configured to carry out said controlling additionally based on the highest relevance within the set of items.

13. The device according to claim 11, wherein said list is one of the following: entries of a phone book, entries of an address book, a list of pieces of music, a list of bookmarks for www pages, a list of landmarks, and a list of options available for selection.

14. The device according to claim 11, wherein said processing unit is further configured to dynamically vary said relevance values on the basis of actions by a user.

15. The device according to claim 11, wherein said processing unit is further configured to dynamically vary said relevance values on the basis of a location of a user.

16. The device according to claim 11, wherein said processing unit is further configured to increase respective relevance value, when an item is visited, modified or added.

17. The device according to claim 11, wherein said processing unit is further configured to decrease respective relevance value, if an item is not revisited or modified during a predefined time period.

18. The device according to claim 11, wherein said processing unit is further configured to set constant minimum and/or maximum values for the scrolling speed.

19. The device according to claim 11, wherein the specific items of said set of said items dynamically varies as said scrolling of items occurs.

20. The device according to claim 11, wherein the specific items of said set of said items dynamically varies as said scrolling of items occurs.

21. A memory comprising a computer program stored thereon, the computer program executable in a computing device, the computer program providing a routine for scrolling items in a list, wherein said computer program controls the computing device
to conduct said scrolling in a user interface,
to maintain a relevance value for each item in the list,
to define said relevance value as ratings explicitly indicating personal preference for said each item in the list, and,
to adaptively control speed of the scrolling, wherein said scrolling speed is controlled based upon the relevance values of a set of said items in the list=and wherein the scrolling speed is based upon an average of the relevance values of the set of said items.

22. A device comprising:
a processing unit;
an input/output module coupled to the processing unit; and
a memory;
wherein the memory comprises a computer program comprising:
means for providing a user interface,
means for conducting scrolling of items in a list as said items are viewed on said user interface,
means for maintaining a relevance value for each item in the list, means for defining said relevance value as ratings explicitly indicating personal preference for said each item in the list, and
means for adaptively controlling speed of the scrolling, wherein said scrolling speed is controlled based upon the relevance values of a set of said items in the list, and wherein the scrolling speed is based upon an average of the relevance values of the set of said items.

* * * * *